Patented Nov. 21, 1939

2,180,336

UNITED STATES PATENT OFFICE 2,180,336

DYESTUFF INTERMEDIATES OF THE ANTHRAQUINONE SERIES

Edwin C. Buxbaum, Silverside Heights, Del., assignor to E. I. du Pont de Nemours & Company, Wilmington, Del., a corporation of Delaware No Drawing. Application August 10, 1938,
Serial No. 224,122

4 Claims. (Cl. 260—381)

This invention relates to the preparation of new dyestuff intermediates of the anthraquinone series, and more particularly to the preparation of new cyanoanthraquinones which carry in the 1-position amino radicals of the class consisting of amino, alkylamino and acidylamino groups, in the 2-position a member of the class consisting of hydrogen, halogen and sulfonic acid, and in the 4-position a halogen atom; there being present in one of the alpha positions 5 and 8, a cyano group.

I have found that, by the introduction of a cyano group into the anthraquinone nucleus carrying the substituents mentioned above, on further substitution with arylamino radicals in the 4-position, dyestuffs are obtained which in the form of sulfonic acids dye in greener shades of blue than have heretofore been obtained by similar compounds not containing the cyano group, and that they exhibit improved fastness to light. The intermediate compounds with which the present invention is concerned are also useful in the preparation of dyestuffs for cellulose acetate silk and, on further condensation, in the preparation of new and valuable vat dyestuffs.

The following examples are given to illustrate the invention. The parts used are by weight.

Example 1

62 parts of 1-amino-5-cyanoanthraquinone are suspended in 250 parts of o-dichlorobenzene. The mixture is stirred until it is thoroughly mixed. 32 parts of chlorosulfonic acid are then added slowly over a period of 15 minutes. The reaction mass is then heated to 130 to 135° C. over a period of 2 hours, and held there for ½ hour, after which the temperature is raised to 150 to 152° C. and held until sulfonation is complete. The sulfonation mass is then steam distilled until free of solvent and filtered hot. The soluble mother liquor is then cooled and salted and the 1-amino-2-sulfo-5-cyanoanthraquinone filtered off and dried. The 1-amino-2-sulfo-5-cyanoanthraquinone is a brown powder which on bromination in dilute acids with mining salt forms 1-amino-2-sulfo-4-bromo-5-cyanoanthraquinone, which is a valuable intermediate for further condensations.

Example 2

124 parts of 1-amino-5-cyanoanthraquinone are suspended in 500 parts of nitrobenzene. The suspension is heated to 135 to 140° C. for 1 hour until dehydration and solution are completed. The solution is then cooled to 85° C. and 2.5 parts of iodine are added. At 85° C., there is added over a period of 4 hours a mixture of 88 parts of bromine and 79.2 parts of sulfuryl chloride. The bromination mass is allowed to cool to 20° C. in about 12 hours. The crystalline precipitate is then filtered off from the nitrobenzene, washed with nitrobenzene and alcohol and finally steam distilled.

In this manner, 1-amino-2,4-dibromo-5-cyanoanthraquinone is obtained in the form of a crystalline red powder having a melting point of 283.8 to 287.6° C.

Example 3

620 parts of 1-amino-5-cyanoanthraquinone are dissolved in 2500 parts of nitrobenzene. The reaction mass is heated to 135 to 140° C. until dehydration is complete. The mixture is cooled to 85° C. and 12.5 parts of iodine added. At 85° C., there is added a mixture of 220 parts of bromine and 177.5 parts of sulfuryl chloride over a period of 4 hours. The bromination is then held at 85° C. for 8 hours, cooled to room temperature over a period of 8 hours and filtered. The crystalline cake is washed with nitrobenzene, alcohol and finally with hot water.

1-amino-2-bromo-5-cyanoanthraquinone is obtained as a crystalline red powder having a melting point of 227.8–233° C. which can be further brominated to 1-amino-2,4-dibromo-5-cyanoanthraquinone.

Example 4

124 parts of 1-amino-8-cyanoanthraquinone prepared over the usual method with cuprous cyanide from 1-amino-8-chloroanthraquinone are added to 500 parts of nitrobenzene. The reaction mass is heated to 140° C. for 1 hour and then cooled to 85° C. 2.5 parts of iodine are then added. At 85° C., there is then added over a period of 4 hours, a mixture of 94 parts bromine and 79.2 parts of sulfuryl chloride. After the addition is complete, the mass is stirred for 8 hours at 85° C. and then cooled to room temperature. It is filtered, washed with nitrobenzene, alcohol and finally with hot water.

The product obtained is a red crystalline material which is 1-amino-2,4-dibromo-8-cyanoanthraquinone.

Example 5

105 parts of 1-methylamino-5-cyanoanthraquinone (obtained by treating 1-methylamino-5-chloroanthraquinone with cuprous cyanide in pyridine) are suspended in 875 parts of nitrobenzene. 45 parts of soda ash are added and the mixture raised to 90° C. in 1 hour and held at 90° C. for an additional hour. The mixture is then cooled to 6 to 8° C. and 68 parts of bromine are added over 5 hours. The bromination mass is stirred 15 hours at 15° C. It is then heated to 95° C. in 1½ hours and held there for 15 minutes, after which it is allowed to cool to room temperature without agitation over a period of 36 hours. The crystalline mass is then filtered off, washed with nitrobenzene and finally with hot water.

It consists of 1-methylamino-4-bromo-5-cyanoanthraquinone and is a red compound having a melting point of 249.4 to 251.5° C.

The 1-methylamino-2,4-dibromo-5-cyanoanthraquinone may be prepared in the same manner by using additional bromine.

*Example 6*

131 parts of 1-methylamino-8-cyanoanthraquinone (obtained by treating 1-methylamino-8-chloroanthraquinone with cuprous cyanide in pyridine) are added to 1100 parts of nitrobenzene containing 75 parts of soda ash and heated to 90° C. in 1 hour. The mixture is held at 90 to 100° C. for 1½ hours and then cooled to 6 to 8° C. At this temperature, there is added 190 parts of bromine in 5 hours after which the temperature is held at 10 to 15° C. for 15 hours. The mixture is then heated to 95° C. in 1 hour and allowed to stand without agitation for 24 hours. The bromination product is filtered off, washed with nitrobenzene, alcohol and finally with hot water.

The red product so obtained in finely crystalline form consists of 1-methylamino-4-bromo-5-cyanoanthraquinone which melts at 309.6 to 310.4° C.

If in the above bromination there is added enough additional bromine to dibrominate the 1-methylamino-8-cyanoanthraquinone, the product obtained is 1-methylamino-2,4-dibromo-8-cyanoanthraquinone.

*Example 7*

352 parts of 1-benzoylamino-5-cyanoanthraquinone (formed by treatment of 1-benzoylamino-5-chloroanthraquinone with copper cyanide in pyridine) are suspended in 2800 parts of nitrobenzene containing 120 parts of soda ash. The mixture is heated to 90° C. and held there for 1½ hours. The mass is then cooled to 6 to 8° C. and 176 parts of bromine added over a period of 5 hours. The bromination is then held for 15 hours at 10 to 15° C. and finally allowed to stand for 24 hours without agitation. A sample is then taken and analyzed for bromine. If bromination is not complete, the temperature is raised to 60° C. until sufficient bromine for monobromination has entered the anthraquinone nucleus. When bromination is complete, the product is isolated in the usual manner. It is a dark brown powder and consists of 1-benzoyl-amino-4-bromo-5-cyanoanthraquinone.

Similarly, 1-benzoylamino-2,4-dibromo-5-cyanoanthraquinone can be obtained by using additional bromine. Other 1-acidylamino-5 or 8-cyano compounds may be employed to give the corresponding dyestuff intermediates, such as toloylamino-, 1-acetylamino-, and 1-formylamino-5 or 8-cyanoanthraquinone, etc.

I claim:

1. Cyanoanthraquinone compounds which carry in the 1-position an amino radical of the class consisting of amino, alkylamino, and acidylamino radicals, in the 2-position a member of the group consisting of hydrogen, bromine and sulfonic acid groups and in the 4-position a bromine atom, there being present in the molecule one cyano group in one of the alpha positions, 5 and 8.

2. 1-methylamino-4-bromoanthraquinones which carry a cyano group in one of the alpha positions 5 and 8.

3. 1-methylamino-4-bromo-5-cyanoanthraquinone.

4. 1-amino-2,4-dibromo-5-cyanoanthraquinone.

EDWIN C. BUXBAUM.